(12) United States Patent
Smith

(10) Patent No.: US 8,705,118 B2
(45) Date of Patent: Apr. 22, 2014

(54) THRESHOLD-BASED LOAD BALANCING PRINTING SYSTEM

(75) Inventor: David Christopher Smith, Bridgewater (AU)

(73) Assignee: Canon Kabushiki Kaisha, Tokyo (JP)

( * ) Notice: Subject to any disclaimer, the term of this patent is extended or adjusted under 35 U.S.C. 154(b) by 764 days.

(21) Appl. No.: 12/152,543

(22) Filed: May 14, 2008

(65) Prior Publication Data

US 2008/0291493 A1 Nov. 27, 2008

(30) Foreign Application Priority Data

May 14, 2007 (AU) ................................ 2007202141

(51) Int. Cl.
*H04N 1/60* (2006.01)
*G06F 3/12* (2006.01)

(52) U.S. Cl.
USPC ........... 358/1.9; 358/1.1; 358/1.13; 358/1.14; 358/1.15; 358/1.16; 382/180; 707/999.1; 707/999.101; 707/999.103; 707/999.104

(58) Field of Classification Search
USPC .................. 358/1.1, 1.9, 1.13–1.18; 382/180; 707/999.1, 999.101, 999.103, 999.104
See application file for complete search history.

(56) References Cited

U.S. PATENT DOCUMENTS

| 6,373,585 | B1 | 4/2002 | Mastie et al. | |
|---|---|---|---|---|
| 6,707,568 | B1 | 3/2004 | Yu | |
| 7,016,061 | B1 | 3/2006 | Hewitt | |
| 7,136,941 | B2 | 11/2006 | Nguyen et al. | |
| 2001/0044797 | A1* | 11/2001 | Anwar | 707/102 |
| 2002/0051169 | A1 | 5/2002 | Nishikawa | |
| 2003/0068099 | A1* | 4/2003 | Chao et al. | 382/282 |
| 2004/0004625 | A1* | 1/2004 | Chao | 345/622 |
| 2004/0111418 | A1* | 6/2004 | Nguyen et al. | 707/100 |

FOREIGN PATENT DOCUMENTS

AU 2002301567 4/2004

\* cited by examiner

*Primary Examiner* — Quang N Vo
(74) *Attorney, Agent, or Firm* — Fitzpatrick, Cella, Harper & Scinto

(57) ABSTRACT

Disclosed is a system (700) for printing a page description comprising a set of instructions, conforming to an interface, to draw at least one object on a page. The system comprises a filter module (705) for simplifying the set of instructions to an output set of instructions that is a subset of the interface, and an output device (711) for printing said output set of instructions. The system also has a set of thresholds (915) and flags (913) controlling the method by which the filter module simplifies said set of instructions, the flags and thresholds being dependent on the capabilities of the output device.

6 Claims, 22 Drawing Sheets

```
DETECT_FLATNESS flag is set
AND
image.Size < FlatnessThreshold
```

Fig. 4a

```
1. REDUCE_IMAGE flag is set
   AND
   (reduced_source_size / image.Size) * 100
       < ReductionThreshold
OR
2. CONVERT_LARGE_TILE flag is set
   AND
   image is tile
   AND
   tile.Size > TileSizeThreshold
OR
3. REMOVE_SPARSE_TILE flag is set
   AND
   image is sparse tile
OR
4. REMOVE_IMAGE_TRANSFORM flag is set
   AND
   (matrix.B <> 0 or matrix.C <> 0)
```

Fig. 4b

```
CONVERT_LARGE_IMAGE flag is set
AND
(
    image.Size > ImageSizeThreshold
    OR
    image.Width > ImageWidthThreshold
    OR
    image.Height > ImageHeightThreshold
)
```

Fig. 4c

```
CONVERT_RADIAL flag is set
AND
radial.Size > RadialSizeThreshold
```

Fig. 4d

```
CONVERT_LINEAR flag is set
AND
linear.NumStops > LinearThreshold
```

Fig. 4e

```
1. OPTIMIZE_PATHS flag is set
   AND
2. bounding box of the current object overlaps
   (bounding box of the last candidate object
   expanded in each direction by ProximityThreshold)
   AND
3. object's boundingbox.Width < PathWidthThreshold
   AND
4. object's boundingbox.Height < PathHeightThreshold
```

Fig. 4f

1. COMBINE_CLIP_SHAPES flag is set
   AND
   clip consists of more than one sub-path
OR
2. COMBINE_NONRECT_CLIP_PATH is set
   AND
   clip is non-rectangular

Fig. 6a

1. CREATE_ODD_EVEN_PATH flag is set
   AND
   path.NumSegments > PathSegmentThreshold
OR
2. CONVERT_GLYPH_IMAGE is set
   AND
   path is glyph
   AND
   operand is image

Fig. 6b

THRESHOLD-BASED LOAD BALANCING PRINTING SYSTEM

CROSS REFERENCE TO RELATED APPLICATION

This application claims the right of priority under 35 U.S.C. §119 based on Australian Patent Application No. 2007202141, filed May 14, 2007, which is incorporated by reference herein in its entirety as if fully set forth herein.

TECHNICAL FIELD

The current invention relates to printing systems and in particular to a method of efficiently converting complex vector-graphics based objects to a simpler equivalent format.

BACKGROUND

When a computer application provides data to a device for printing and/or display, an intermediate description of the page is often given to device driver software in a page description language. The intermediate description of the page includes descriptions of the graphic objects to be rendered. This contrasts with some arrangements where raster image data is generated directly by the application and transmitted for printing or display. Examples of page description languages include Canon's LIPS™ and HP's PCL™.

Equivalently, the application may provide a set of descriptions of graphic objects via function calls to a graphics device interface (GDI) layer, such as the Microsoft Windows™ GDI layer. The printer driver for the associated target printer is the software that receives the graphic object descriptions from the GDI layer. For each graphic object, the printer driver is responsible for generating a description of the graphic object in the page description language that is understood by the rendering system of the target printer.

In some systems the application or operating system may store the application's print data in a file in some common well-defined format. The common well-defined format is also called the spool file format. During printing, the printer driver receives the spool file, parses the contents of the file and generates a description of the parsed data into an equivalent format which is in the page description language that is understood by the rendering system of the target printer. Examples of spool file formats are Adobe's PDF™ and Microsoft's XPS™.

In order to print a spool file residing on a host PC on a target printer, the spool file contents must first be converted to an equivalent print job which is in the format of the page description language. A filter module typically residing in a printer driver is used to achieve this.

Until recently the functionality of the spool file format has closely matched the functionality of the printer's page description language. Recently, new spool file formats now contain graphics functionality which is far more complex than that supported by the legacy page description languages. In particular some PDL formats only support a small subset of the spool-file functionality.

In some systems, the printer driver tells the underlying graphics device interface layer which functionality it supports. The GDI layer then only provides objects which meet the capabilities of the printer driver, by rasterizing objects. In many cases the GDI layer's rasterization produces incorrect results when transparency is present.

In other systems, the page data is analysed and the printing system decides whether to render the page to an image on the PC, or whether to convert the page data to a PDL print job. In such systems the presence of even a single object which cannot be converted to the PDL format may force the entire page to be rendered to an image. Variations of such systems may render a band of the page which contains the object. Such systems suffer if the object covers the entire page, such as in a watermark or a border graphic, then the entire page must still be rendered.

Still in other systems, the object itself is converted to an image. Again, such systems become inefficient when the object covers the entire page, especially if such objects require compositing over previously processed objects. An example of compositing is alpha compositing. In a printing system which has a page description language which does not support alpha compositing, any semi-transparent objects requiring alpha compositing must be converted to opaque objects. In such systems, the presence of a single object requiring alpha compositing causes the entire page of objects to be rendered to an image. In other systems, the object's transparency characteristics are either simulated using raster operation techniques, which produce close but invariably incorrect results; or, the object's transparency characteristics are ignored simply producing incorrect results.

SUMMARY

It is an object of the present invention to overcome, or at least ameliorate, one or more disadvantages of existing arrangements.

In accordance with one aspect of the present invention there is disclosed a system for printing a page description comprising a set of instructions, conforming to an interface, to draw at least one object on a page, said system comprising:

(a) a filter module for simplifying said set of instructions to an output set of instructions that is a subset of said interface;

(b) an output device for printing said output set of instructions, and (c) a set of thresholds and flags controlling the method by which said filter module simplifies said set of instructions, said flags and thresholds being dependent on the capabilities of said output device.

Preferably some or all of said thresholds are set by user interface dialog box.

Other aspects are also disclosed.

BRIEF DESCRIPTION OF THE DRAWINGS

One or more embodiments of the invention will now be described with respect to the following drawings, in which:

FIG. 4*a* is a pseudo code fragment implementing a condition for the criteria for flatness detection, as used in the method of FIG. 3;

FIG. 4*b* is a pseudo code fragment implementing a condition for the criteria for rendering an image, as used in the method of FIG. 3;

FIG. 4*c* is a pseudo code fragment implementing a condition for the criteria for dividing a large image, as used in the method of FIG. 3;

FIG. 4*d* is a pseudo code fragment implementing a condition for the criteria for rendering a radial blend, as used in the method of FIG. 3;

FIG. 4e is a pseudo code fragment implementing a condition for the criteria for rendering a linear blend, as used in the method of FIG. 3;

FIG. 4f is a pseudo code fragment implementing a condition for the criteria for optimizing a path, as used in the method of FIG. 14;

FIG. 6a is a pseudo code fragment implementing a condition for the criteria for rendering a clip and path, as used in the method of FIG. 5;

FIG. 6b is a pseudo code fragment implementing a condition for the criteria for rendering a path, as used in the method of FIG. 5;

FIG. 10b is a diagram showing the edges of the 3 objects in FIG. 10a;

FIG. 10c is a diagram of a display list after processing the first object in FIG. 10a;

FIG. 10d is a diagram of a display list after processing the second object in FIG. 10a;

FIG. 10e is a diagram of a display list after processing the third object in FIG. 10a;

DETAILED DESCRIPTION INCLUDING BEST MODE

Printing System

Figure 7:
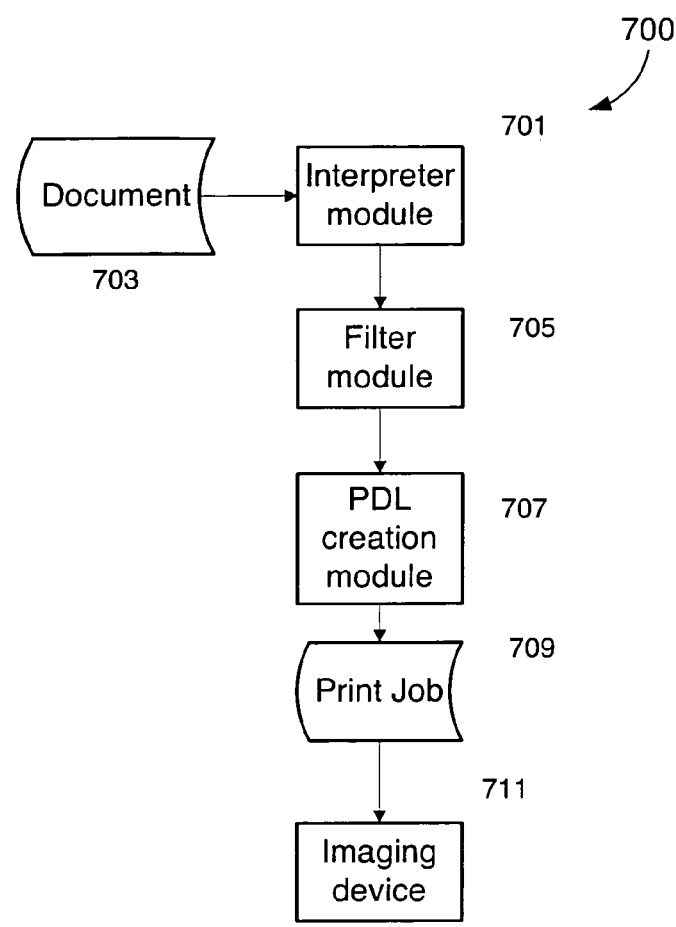
FIG. 7 is a diagram of the modules of the printing system within which the embodiments of the invention may be practiced.

A printing system 700 within which the embodiments of the invention may be practiced is illustrated in FIG. 7. An Interpreter module 701 parses a document 703 and converts the objects stored in the document to a common intermediate format. Each object is passed to the Filter module 705. The Filter module 705 converts incoming object data to equivalent object data which match the functionality of the PDL creation module 707. The PDL creation module 707 converts object data to a print job in the PDL format. The job is sent to the Imaging device 711 which contains a PDL interpreter and a raster image processor (RIP) to generate a pixel-based image of each page at "device resolution". (Herein all references to "pixels" refer to device-resolution pixels unless otherwise stated).

Figure 18:
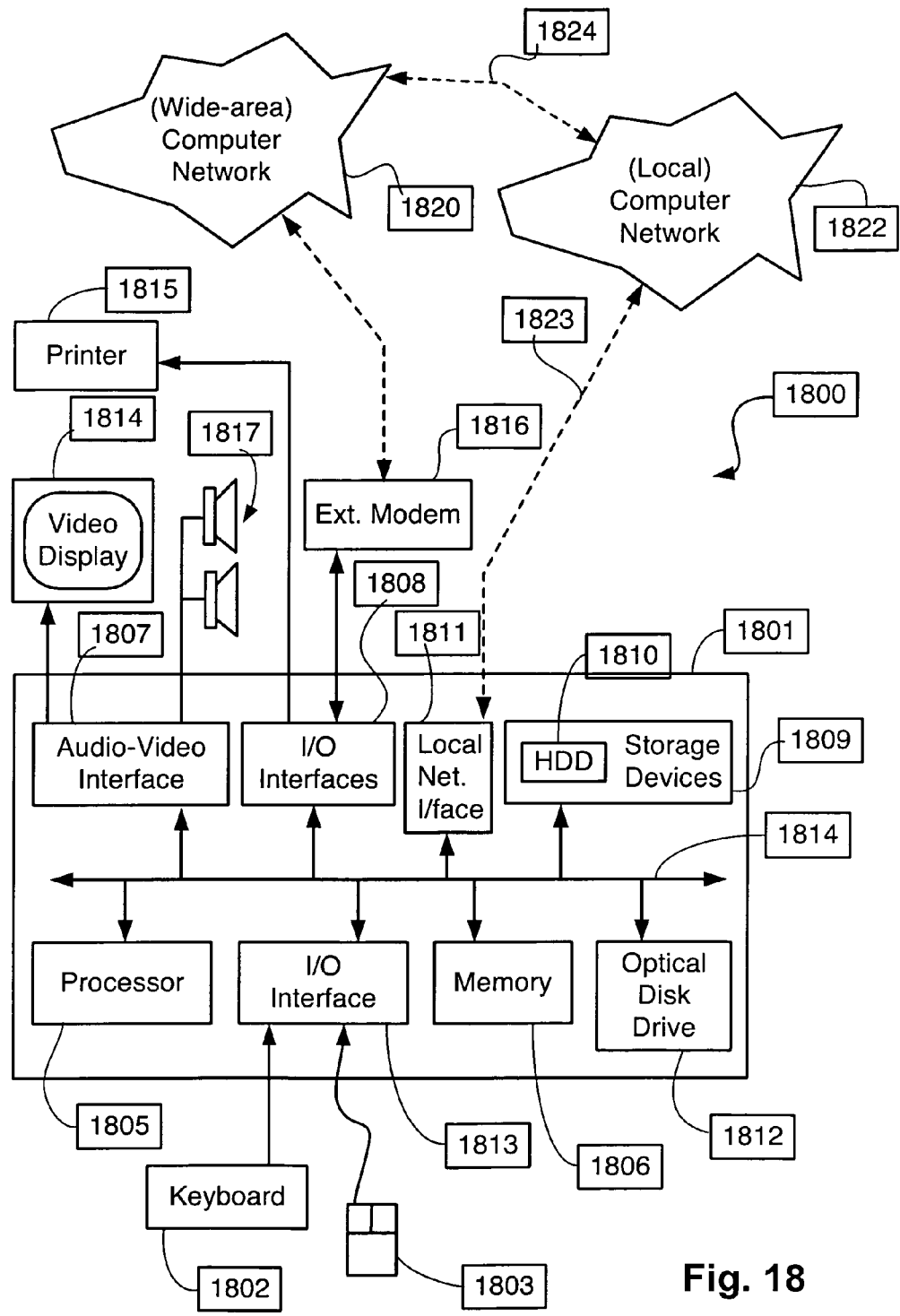
FIG. 18 is a block diagram of a computer system on which the embodiments of the invention may be implemented.

The Interpreter module 701, Filter module 705, PDL creation module 707 are typically components of a device driver implemented as software executing on a general-purpose computer system 1800, such as that shown in FIG. 18. In particular, the steps of the described methods are effected by instructions in the software that are carried out by a processor 1805 of the computer system 1800. The instructions may be formed as one or more code modules, each for performing one or more particular tasks. The software may also be divided into two separate parts, in which a first part performs the described method and a second part manages a user interface between the first part and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for implementing the method 300 described herein.

The computer system 1800 comprises a computer module 1801, input devices such as a keyboard 1802 and mouse 1803, imaging devices (as 711) including a printer 1815 and a display device 1814. A Modulator-Demodulator (Modem) transceiver device 1816 is used by the computer module 1801 for communicating to and from a communications network 1820, for example connectable via a telephone line 1821 or other functional medium. The modem 1816 can be used to obtain access to the Internet, and other network systems, such as a Local Area Network (LAN) or a Wide Area Network (WAN).

The computer module 1801 typically includes at least one processor unit 1805 as mentioned above, a memory unit 1806, for example formed from semiconductor random access memory (RAM) and read only memory (ROM), input/output (I/O) interfaces including a video interface 1807, and an I/O interface 1813 for the keyboard 1802 and mouse 1803 and optionally a joystick (not illustrated), and an interface 1808 for the modem 1816. A storage device 1809 is provided and typically includes a hard disk drive 1810 and a floppy disk drive 1811. A magnetic tape drive (not illustrated) may also be used. A CD-ROM drive 1812 is typically provided as a non-volatile source of data. The components 1805 to 1813 of the computer module 1801, typically communicate via an interconnected bus 1804 and in a manner which results in a conventional mode of operation of the computer system 1800 known to those in the relevant art. Examples of computers on which the described arrangements can be practiced include IBM-PC's and compatibles, Sun Sparcstations or alike computer systems evolved therefrom.

Typically, the device driver is resident on the hard disk drive 1010 and read and controlled in its execution by the processor 1805. Intermediate storage of the program and any data fetched from the network 1820 may be accomplished using the semiconductor memory 1806, possibly in concert with the hard disk drive 1810. In some instances, the application program may be supplied to the user encoded on a CD-ROM or floppy disk and read via the corresponding drive 1812 or 1811, or alternatively may be read by the user from the network 1820 via the modem device 1816. Still further, the software can also be loaded into the computer system 1800 from other computer readable media. The term "computer readable medium" as used herein refers to any storage medium or transmission medium that participates in providing instructions and/or data to the computer system 1800 for execution and/or processing. Examples of computer readable storage media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 1801. Examples of computer-readable transmission media include radio or infra-red transmission channels as well as a network connection to another computer or networked device, and the Internet or Intranets including email transmissions and information recorded on websites and the like.

The Imaging Device 711 is typically a Laser Beam or Inkjet printer device. One or more of, PDL creation module 707, filter module 705, and interpreter module 701 may also be implemented as software or hardware components in an embedded system residing on the imaging device 711. Such an embedded system would be a simplified version of the computer system 1800, with a processor, memory, bus, and interfaces.

Definition of "Object"

In the common intermediate format, an object consists of:

path—the boundary of the object to fill eg string of text character glyphs, set of Bézier curves, set of straight lines . . .

clip—the region to which the path is limited operator—the method of painting the pixels eg Porter and Duff operator, ROP2, ROP3, ROP4, . . .

operands—the fill information (source, pattern, mask)

eg (source or pattern): Flat, Image, Tiled Image, Radial blend, 2 pt blend, 3 pt blend . . . .

Notation of "Object"

For convenience the drawing instruction for an object in the common intermediate format is written as:

object(path, clip, source)

where operator=Porter and Duff "SRCOVER". Note that the techniques described herein can be applied to all types of compositing operators.

Definition of "Group"

In the common intermediate format, a group of objects can be masked by an opacity mask which imparts transparency to the group as a whole.

Notation of "Group"

The drawing instructions for a group of objects is written

```
group(mask)
object(path, clip, source)
object(path, clip, source)
...
endgroup( )
```

Definition: Core Conversions

Core conversions are conversions which must be performed by the Filter module 705 in order for the PDL creation module 707 to generate a print job 709 that results in equivalent output when rendered on device 711. The following sections describe core conversion pertaining to typical devices 711.

Core Conversion: Convert Large Tile

One core conversion converts an operand which is considered to be a large tile to an equivalent image operand. The conversion item is herein referred to as "CONVERT_LARGE_TILE". Like the subsequently described conversions, it may be defined as a bitflag in the C programming language:

define CONVERT_LARGE_TILE 0x00000001

Three threshold values are provided:

TileSizeThreshold—this value represents the maximum allowed tile size in pixels, being the width of the tile in pixels multiplied by the height of the tile in pixels.

TileWidthThreshold—this value represents the maximum allowed tile width in pixels.

TileHeightThreshold—this value represents the maximum allowed tile height in pixels.

If the tile exceeds any of the thresholds, then the tile operand is replaced with an equivalent image operand which is the size of the visible bounding box of the object, i.e. the bounding box of the object intersected with the page bounds and the bounding box of any applicable clip.

Core Conversion: Convert Large Image

Another core conversion converts a drawing instruction which has a large image operand to a series of drawing instructions where each contains a fragment of the large image. The conversion item is herein referred to as "CONVERT_LARGE_IMAGE".

Three threshold values are provided:

ImageSizeThreshold—this value represents the maximum allowed image size in pixels, being the width of the image in pixels multiplied by the height of the image in pixels.

ImageWidthThreshold—this value represents the maximum allowed image width in pixels.

ImageHeightThreshold—this value represents the maximum allowed image height in pixels.

If the image exceeds any of the thresholds, then the image is divided into smaller images, where each image is no greater than the specified thresholds, and each image is output to the PDL creation module 707 as a separate drawing instruction.

Core Conversion: Convert Linear

Another core conversion converts a linear multi-stop gradient operand into an image. The conversion item is herein referred to as "CONVERT_LINEAR".

One threshold value is provided:

LinearThreshold—this value represents the maximum allowed number of gradient stops.

If the number of gradient stops in the operand exceeds this value, then the operand is replaced with an equivalent image operand which is the size of the visible bounding box of the object.

Core Conversion: Convert Radial

Another core conversion converts a radial multi-stop gradient operand into an image. The conversion item is herein referred to as "CONVERT_RADIAL".

One threshold value is provided:

RadialThreshold—this value represents the maximum allowed number of gradient stops.

If the number of gradient stops in the operand exceeds this value, then the operand is replaced with an equivalent image operand which is the size of the visible bounding box of the object.

Core Conversion: Combine Clip Shapes

Another core conversion converts a clip consisting of multiple complex shapes into a simple non-self-overlapping clip path outline. The conversion item is herein referred to as "COMBINE_CLIP_SHAPES".

One threshold value is provided:

ClipShapesThreshold—this value represents the maximum allowed number of clip shapes.

If the number of clip shapes in the clip exceeds this value, then the clip is converted to a simple non-self-overlapping clip path outline.

Core Conversion: Create Simple Path

Figure 11A:
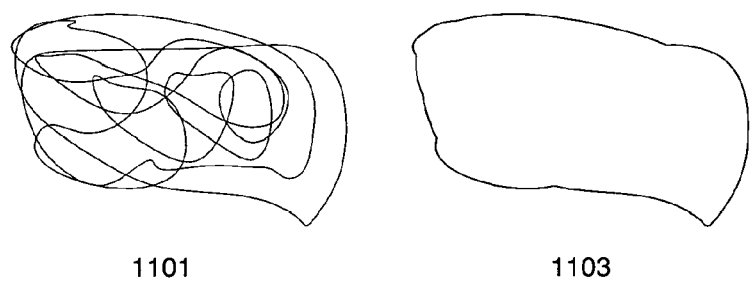
FIG. 11a is a diagram of an exemplary complex path and a corresponding simple path.

Another core conversion converts a complex self-overlapping path with a non-zero-winding fill-rule such as path 1101 shown in FIG. 11*a* into a simple non-self-overlapping path outline such as path 1103. The conversion item is herein referred to as "CREATE_ODD_EVEN_PATH".

One threshold value is provided:

PathSegmentThreshold—this value represents the maximum allowed number of segments in the path.

If the number of segments in the path exceeds this value, then the path is converted to a simple path outline.

Core Conversion: Remove Transparency

Figure 10A:
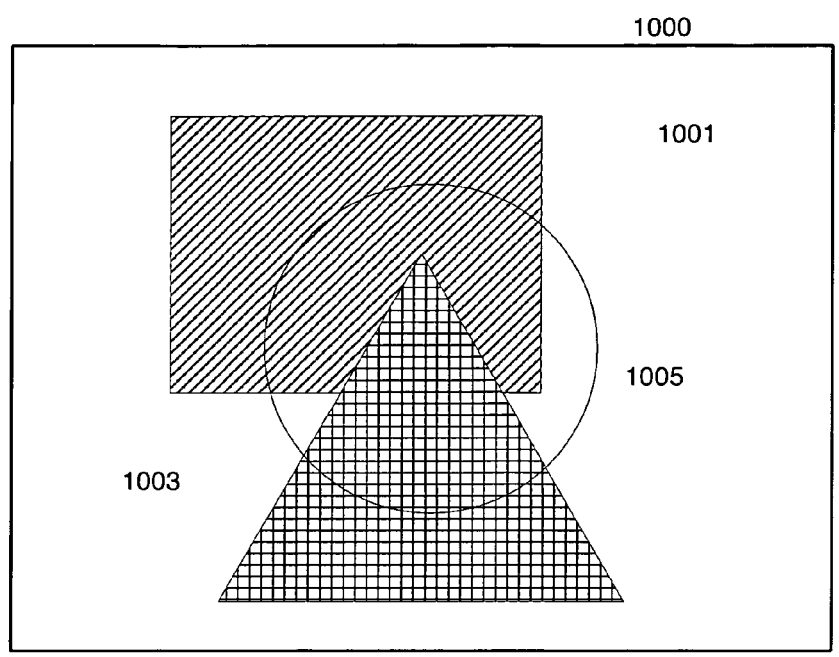
FIG. 10a is a diagram of an exemplary page containing 3 objects.
Figure 12A:
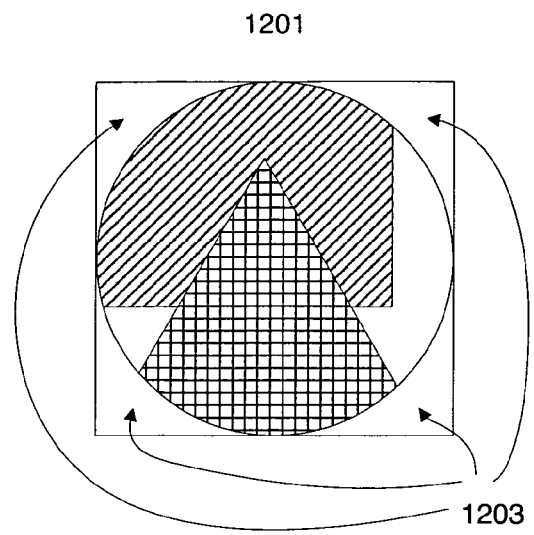
FIG. 12a is a diagram of an exemplary rendered image resulting from the second mode of operation of the versatile RIP module of FIG. 9.
Figure 12B:
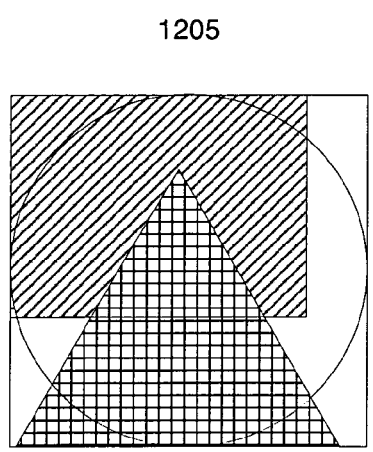
FIG. 12b is a diagram of a rendered image resulting from the third mode of operation of the versatile RIP module of FIG. 9.

Another core conversion converts an object containing transparency, such as circle 1005 in FIG. 10*a*, into an opaque image, such as the one shown FIG. 12*a* or such as the one shown in FIG. 12*b*. The conversion item is herein referred to as "REMOVE_TRANSPARENCY".

One threshold value is provided:

RenderInPathThreshold—this value represents the maximum allowed ratio of the count of pixels inside the visible region of the path to the number of pixels in the bounding box of the visible region of the path.

If the ratio exceeds this value, then an image as in FIG. 12*b* is generated, otherwise an image as in FIG. 12*a* is generated.

Core Conversion: Sparse Tile

Another core conversion converts a tile containing transparency into an image containing transparency. The conversion item is herein referred to as "REMOVE_SPARSE_TILE". No thresholds are required for this conversion item.

Core Conversion: Remove Image Transform

Another core conversion converts a tile or image which is skewed or rotated into an unrotated image. The conversion item is herein referred to as "REMOVE_IMAGE_TRANSFORM". No thresholds are required for this conversion item.

Core Conversion: Combine Non-Rect Clip Path

Another core conversion combines a clip and a path to create a simple path outline if the clip is non-rectangular. The conversion item is herein referred to as "COMBINE_NONRECT_CLIP_PATH". No thresholds are required for this conversion item.

Core Conversion: Remove Glyph Image

Another core conversion converts a string of glyphs which are filled with an image into a simple path outline. The conversion item is herein referred to as "REMOVE_GLYPH_IMAGE". No thresholds are required for this conversion item.

Core Conversion: Remove Group

Another core conversion converts a series of drawing instructions for a group of objects such as the following

```
group(mask)
    object(path, clip, source)
    object(path, clip, source)
    ...
endgroup( )
``` into a single opaque object consisting of an image such as that of FIG. 12*b*. The conversion item is herein referred to as "REMOVE_GROUP". No thresholds are required for this conversion item.

It can be seen by those skilled in the art that the visible bounding box of the resulting image is the union of visible bounding boxes of each object within the group.

Core Conversion: Summary

The following table summarises the core conversion flags and corresponding thresholds, which may be implemented by the module 705 to ensure a document in the common intermediate format can be converted to a legacy PDL format by module 707 without loss of quality.

| Core conversion flags | Thresholds |
| --- | --- |
| CONVERT_LARGE_TILE | TileSizeThreshold |
|  | TileWidthThreshold |
|  | TileHeightThreshold |
| CONVERT_LARGE_IMAGE | ImageSizeThreshold |
|  | ImageWidthThreshold |
|  | ImageHeightThreshold |
| CONVERT_LINEAR | LinearThreshold |
| CONVERT_RADIAL | RadialSizeThreshold |
| COMBINE_CLIP_SHAPES | ClipShapesThreshold |
| CREATE_ODDEVEN_PATH | PathSegmentThreshold |
| REMOVE_TRANSPARENCY | RenderInPathThreshold |

The following table summarises the core conversions which do not require thresholds.

| Core conversion flags |
| --- |
| REMOVE_SPARSE_TILE |
| REMOVE_IMAGE_TRANSFORM |
| COMBINE_NONRECT_CLIP_PATH |
| CONVERT_GLYPH_IMAGE |
| REMOVE_GROUP |

Definition: Optimizing Conversions

Optimizing conversions are conversions which may be performed by filter module 705 so that module 707 generates efficient print jobs.

Optimizing Conversion: Detect Flatness

One optimizing conversion detects if an image operand contains only one colour. The conversion item is herein referred to as "DETECT_FLATNESS".

One threshold value is provided:

FlatnessThreshold—this value represents the size of the maximum allowed image in pixels.

If the size of an image in pixels is less than this value, then the image is scanned to detect if it contains only one colour, and if so the image operand is replaced with a flat colour operand and the image operand is deleted.

Optimizing Conversion: Reduce Image

Another optimizing conversion detects if an image operand can be reduced to device resolution. The conversion item is herein referred to as "REDUCE_IMAGE".

One threshold value is provided:

ReductionThreshold—this value represents the minimum allowed ratio of the size of the visible bounding box in pixels to the size of the image.

If the ratio exceeds this value, then the image is not modified, otherwise the image is rendered to an image in device space within the visible bounding box.

Optimizing Conversion: Optimize Paths

Another optimizing conversion converts a series of drawing instructions consisting of small paths into a single equivalent drawing instruction. The conversion item is herein referred to as "OPTIMIZE_PATHS".

Figure 15A:
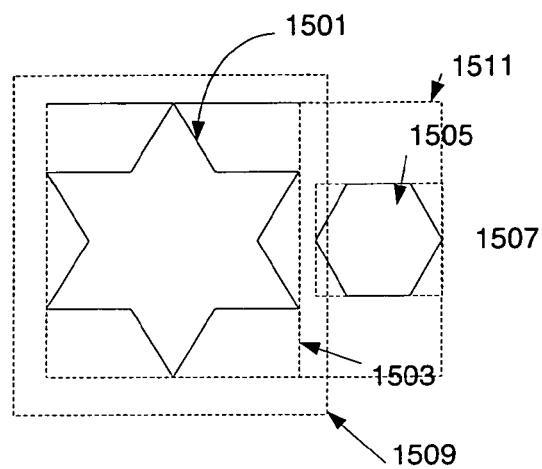
FIG. 15a is a diagram of a star and a 6-sided polygon.
Figure 15B:
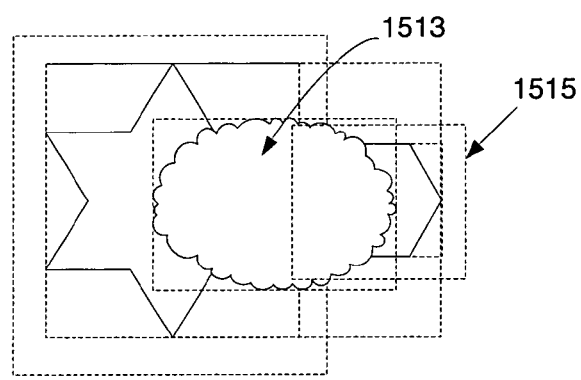
FIG. 15b is a diagram of a star, a 6-sided polygon and a cloud-shaped object.

Three threshold values are provided:

ProximityThreshold—this value represents the amount of expansion in pixels of the bounding box of the last candidate object when testing if the current object is a candidate object. This threshold allows an object to be included in the set of candidate objects even though it doesn't overlap the last candidate object. For example in FIG. 15a, a first object 1501 has bounding box 1503. A second object 1505 has bounding box 1507. A ProximityThreshold of T pixels is specified. The bounding box 1503 is expanded in each direction by T pixels to the bounding box 1509. Object 1505's bounding box 1507 overlaps bounding box 1509 and so object 1505 is added to the set of candidate objects which will be converted. Accumulated bounding box 1511 is the bounding box which is the union of each candidate object's bounding boxes (in this case 1503 and 1507). In FIG. 15b a third object 1513 is considered. Since its bounding box overlaps the bounding box 1515 which is the bounding box 1507 expanded in each direction by T pixels, the third object is added to the set of candidate objects and the accumulated bounding box is expanded to include the bounding box of the third object.

PathWidthThreshold—this value represents the maximum width in pixels of the visible bounding box of the current object.

PathHeightThreshold—this value represents the maximum height in scanlines of the visible bounding box of the current object.

If the current object's bounding box does not overlap the bounding box of the most recently added candidate object enlarged by the ProximityThreshold, then the current object is not considered a candidate object.

If the current object's width or height exceeds the PathWidthThreshold or PathHeightThreshold respectively, then the current object is not considered a candidate object.

Other thresholds may also be utilized, such as thresholds for restricting the size of the accumulated bounding box 1511. This is particularly necessary if the set of candidate objects contain different fill types. If the set of candidate objects use the same fill, then such thresholds are not necessary.

Also, the RenderInPathThreshold may be used in the case that the set of candidate objects use different fills as described in the section below with reference to FIG. 14.

Optimising Conversion: Summary

The following table indicates some of the optimizing conversions which may be implemented by filter module 705 in order to improve the efficiency of the final print job.

| Optimizing conversion flags | Thresholds |
|---|---|
| DETECT_FLATNESS | FlatnessThreshold |
| REDUCE_IMAGE | ReductionThreshold |
| OPTIMIZE_PATHS | ProximityThreshold |
|  | PathWidthThreshold |
|  | PathHeightThreshold |

Filter Module Components

Figure 9:
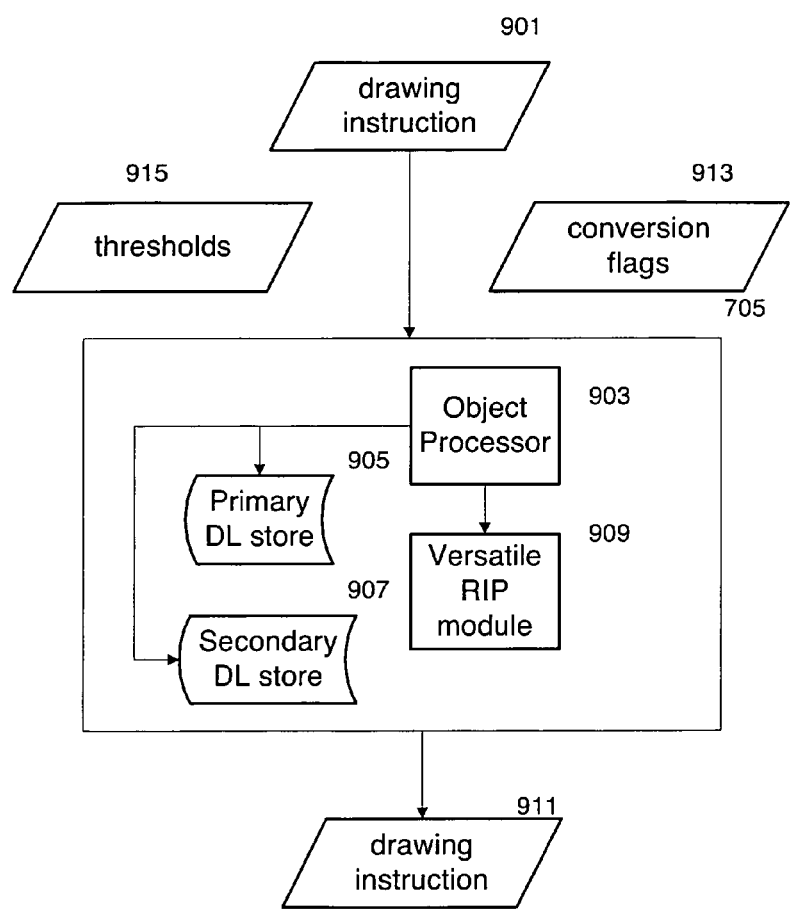
FIG. 9 is a diagram of the modules of the filter module as used in the system of FIG. 7.

The following description refers to FIG. 9 which is a module diagram of the components of the filter module 705 according to an embodiment of the invention.

The filter module 705 is initialised with a set of conversion flags 913, indicating which "conversion items" are to performed and a set of thresholds 915 controlling the level of conversion for the flagged conversion items as described above. For example some PDLs may support 8×8 tiles, whereas other PDLs may support 256×256 tiles. The flags are set by the designer of the device driver according to the capabilities of the imaging device 711, while the thresholds may be set by the designer of the device driver, or by the user, either at print time from a user interface dialog box, or at installation time when the device driver is installed on the host computer.

The filter module 705 receives a stream of drawing instructions 901 from the interpreter module 701 conforming to the common intermediate format specification, and outputs a visually equivalent stream of drawing instructions 911 conforming to the same common intermediate format specification. The output drawing instructions 911 conform to a functionality-based subset of the common intermediate format which enables the PDL creation module 707 to generate a print job 709.

The filter module 705 consists of an Object Processor 903, a Versatile RIP module 909, a primary DL store 905 and a Secondary DL store 907. The Object Processor 903 performs the flagged core and optimising conversions of objects ranging from object-component granularity (single conversions on path, clip and operand) to multi-object granularity (groups of objects) using the Versatile RIP module 909.

The Object Processor 903 stores object data in the primary display list store 905 in order to perform core conversions, and in addition stores object data in the secondary display list store 907 in order to perform optimising conversions. An object can be stored in both display list stores 905 and 907 at the same time.

Versatile RIP

The Versatile RIP module 909, and DL stores 905 and 907 are preferably implemented using pixel sequential rendering techniques. The pixel-sequential rendering approach removes the need for a frame store in that each pixel is generated in raster order. Each object on being added to the display list is decomposed into monotonically increasing edges, which link to priority or level information (see below) and fill information (i.e. "operand" in the common intermediate format). Then during rendering, each scanline is considered in turn and the edges of objects that intersect the scanline are held in increasing order of their points of intersection with the scanline. These points of intersection, or edge crossings, are considered in order, and activate or deactivate objects in the display list. Between each pair of edges considered, the colour data for each pixel that lies between the first edge and the second edge is generated based the fill information of the objects that are active for that span of pixels. In preparation for the next scanline, the coordinate of intersection of each edge is updated in accordance with the properties of each edge, and the edges are re-sorted into increasing order of intersection with that scanline. Any new edges are also merged into the list of edges, which is called the active edge list. Graphics systems which use pixel sequential rendering have significant advantages in that there is no pixel frame store or line store and no unnecessary over-painting.

Display List Store

When an object is added to the display list store 905 or 907, it is decomposed by the Object Processor 903 into three components:

Edges, describing the outline of the object.

Drawing information, describing how the object is drawn on the page.

Fill information, describing the colour of the object.

Outlines of objects are broken into up and down edges, where each edge proceeds monotonically down the page. An edge is assigned the direction up or down depending on whether it activates or deactivates the object when scanned along a row.

An edge is embodied as a data structure. The data structure contains:
Points describing the outline of the edge,
The x position on the current scanline,
Edge direction.

Drawing information, or level data, is stored in a data structure called a level data structure. The data structure contains:
Z-order integer, called the priority.
Fill-rule, such as odd-even or non-zero-winding.
Information about the object, such as if the object is a text object, graphic object or image object.
Compositing operator.
The type of fill being drawn, such as an image, tile, or flat colour.
Clip-count, indicating how many clips are clipping this object. This is described in more detail below.

Fill information, or fill data, is stored in a data structure called a fill data structure. The contents of the data structure depend on the fill type. For an image fill, the data structure contains:
x and y location of the image origin on the page
width and height of the image in pixels
page-to-image transformation matrix
a value indicating the format of the image data, (for example 32 bpp RGBA, or 24 bpp BGR, etc. . . . )
a pointer to the image data.

For a flat fill, the data structure contains an array of integers for each colour channel.

In a typical implementation, each edge data structure also has a pointer to a level data structure. Each level data structure also has a pointer to a fill data structure.

A Display List Store 905 or 907 in the embodiment consists of 2 sets of edge lists. The first edge list contains the edges of all objects added before the current object. The second edge list contains the edges of the current object.

FIG. 10a shows an example page comprising a first object 1001 being an opaque orange square, a second object 1003 over the first object, being a triangle filled with an opaque tile, and a third object 1005 over objects 1001 and 1003, being a semi-transparent red circle.

Figure 10B:
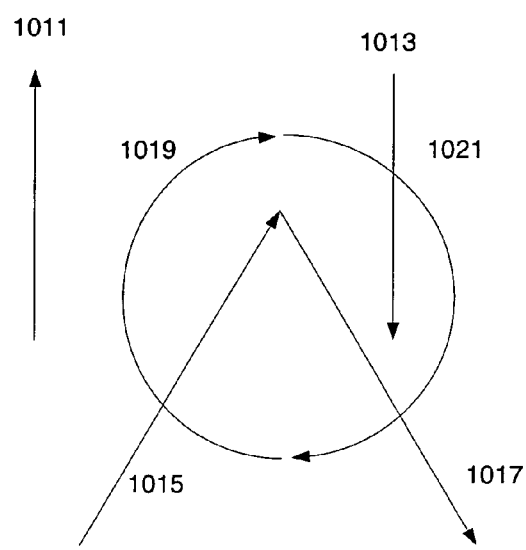

FIG. 10b shows the up and down edges of the 3 objects.
Object 1001 has—
edges=1011 (up), 1013 (down)
level data O1={fill-rule=non-zero-winding, object-type=graphic, priority=1}.
fill data F1=RGBA=255, 128, 0, 255 (opaque orange).
Object 1003 has—
edges=1015 (up), 1017 (down)
level data O2={fill-rule=non-zero-winding, object-type=image, priority=2}.
fill data F2=RGBA=opaque tile.
Object 1005 has—
edges=1019 (up), 1021 (down)
level data O3={fill-rule=non-zero-winding, object-type=graphic, priority=3}.
fill data F3=RGBA=255, 0, 0, 128 (semi-transparent red).

Figure 10C:
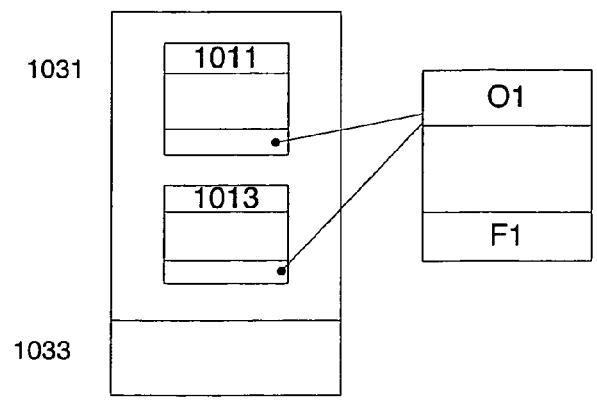

In FIG. 10c object 1001 is added to a display list. The display list consists of an array 1030 partitioned into 2 edge lists: the CurrentObject edge list 1031, and the Background edge list 1033. The Background edge list contains edges of all objects added up to this point, where each edge points to the level and fill data containing drawing information and fill information for the object. The Background edge list is sorted in ascending y and ascending x order. Object 1001 is the first object to be added to the display list, so the Background edge list 1033 is empty. CurrentObject edge list 1031 contains the edges 1011 and 1013 of object 1001. The edge list 1031 is sorted in ascending y and ascending x order.

Figure 10D:
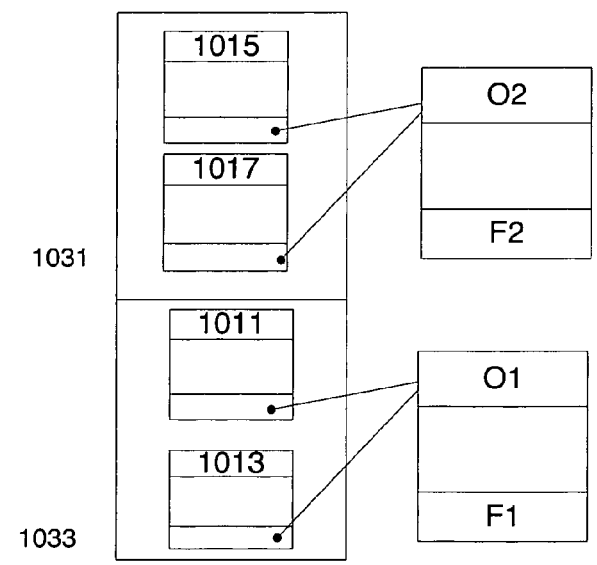

Next, object 1003 is added to the display list. Before the object 1003 is added, the contents of CurrentObject edge list 1031 is merged into the Background edge list. This process is called the "commit" process. In FIG. 10d, the Background edge list now contains edges 1011 and 1013. The CurrentObject edge list contains edges 1015 and 1017.

Figure 10E:
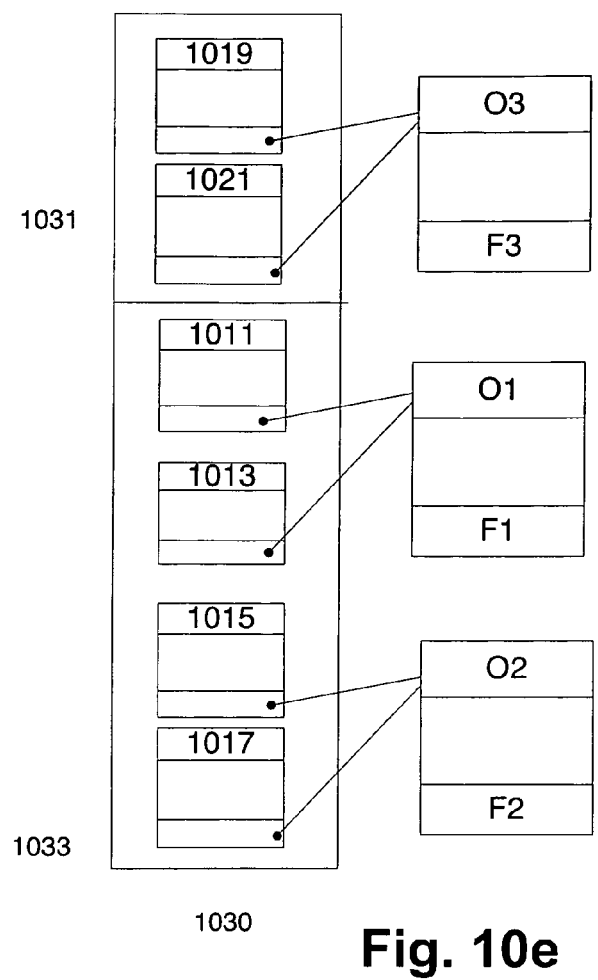

In FIG. 10e, the display list is committed and edges 1015 and 1017 are merged into the Background edge list 1033. Note that in edge list 1033 edges 1015 and 1017 appear after edges 1011 and 1013. This is because the edges are sorted in ascending y order and then ascending x order. The CurrentObject edge list contains edges 1019 and 1021 of object 1005.

Versatile RIP Modes

The versatile RIP module 909 has four modes of operation.
In the first mode of operation, the Versatile RIP module 909 is configured to
i) operate only on the CurrentObject edge list,
ii) output a simple path outline, and
iii) return the number of pixels inside the simple path outline.

The Versatile RIP module 909 achieves this by, instead of generating colour data for each span of pixels on each scanline, simply outputting the integral 3-tuple (start-edge-x, scanline-y, num-pixels). The accumulated set of tuples defines the simple path outline. The sum of the "num-pixels" element of all tuples defines the number of pixels inside the simple path outline.

Figures 11B, 11C:
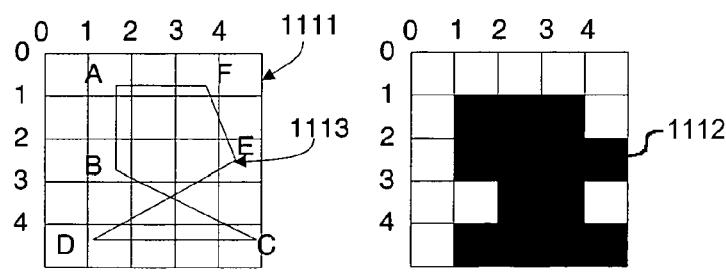
FIGS. 11b and 11c depict diagrams of an exemplary path and its rendered output.

In FIG. 11a complex path 1101 filled with a NZW fill rule is converted to simple path outline 1103, which is the equivalent path with a massive reduction in line segments and complexity. This method is described by way of the example in FIG. 11b where a path 1113 is defined by 6 points A(1.6, 0.7), B(1.6, 2.6), C(4.8, 4.4), D(1.1, 4.4), E(4.4, 2.4), F(3.7, 0.7). FIG. 11c shows the expected result 1112 of rendering path 1113. At scanline 0 (1111), no pixel span is identified since no edges cross scanline 0. At scanline 1, a pixel span is identified between edges AB and FE. The tuple (1, 1, 3) is output. At scanline 2, a pixel span is identified between edges AB and FE. Tuple (1, 2, 4) is output. At scanline 3, a pixel span is identified between edges BC and DE. Tuple (2, 3, 2) is output. At scanline 4, a pixel span is identified between edges DE and BC. Tuple (1, 4, 4) is output. The sum of the num-pixels elements of the tuples is 3+4+2+4=13 pixels.

Representations of the simple path outline other than as a set of 3-tuples are possible from the stream of identified pixel spans. One such representation is the 4-tuple (top, left, width, height) which describes a rectangle. For example, at scanline 1, instead of the tuple (1, 1, 3) the rectangle (top, left, width, height)=(1, 1, 3, 1) could be generated, and so on. A further method as described in Australian Application Number 2002301567 (Applicant Canon Kabushiki Kaisha, Inventor Smith, David Christopher, Title "A Method of Generating Clip Paths for Graphic Objects") combines such rectangles and generates a set of edges describing the combined set of rectangles. Yet other representations and methods are possible to generate the simple path outline from the stream of identified pixel spans.

In the second mode of operation, the Versatile RIP module 909 is configured to i) include both the CurrentObject edge list and the Background edge list in the pixel-sequential rendering process, and ii) output an image in which only pixels lying within the CurrentObject are written to an image buffer.

Consider the semi-transparent circle 1005 of FIG. 10a. When the circle is added to the display list, the display list is represented as shown in FIG. 10e. The Versatile RIP module 909 in the second mode of operation merges both sets of edge lists (1031 and 1033) and uses pixel sequential rendering techniques to generate pixel data only between the edges of the CurrentObject. The result of rendering the semi-transparent circle 1005 using this technique is shown in FIG. 12a. The resulting image contains four areas 1201 not affected by the versatile RIP module 909. Only pixel data within the circle 1005 is written to the image buffer 1201. Prior to rendering, the image buffer 1201 may be initialised with some arbitrary background colour value, such as a value representing "white" or "black" pixels.

In the third mode of operation, the Versatile RIP module 909 is configured to i) include both the CurrentObject edge list and the Background edge list in the pixel-sequential rendering process, and ii) output an image in which only pixels lying within a specified bounding box are written to an image buffer.

Again, consider the semi-transparent circle 1005 of FIG. 10a. When the circle is added to the display list, the display list is represented as shown in FIG. 10e. The Versatile RIP module 909 merges both sets of edge lists (1031 and 1033) and uses pixel sequential rendering techniques to generate pixel data between the edges of a specified bounding box. The result of rendering the semi-transparent circle 1005 using this technique is shown in FIG. 12b, where the specified bounding box is the bounding box of the circle 1005. Only pixel data within the specified bounding box is written to the image buffer 1205.

The key advantage of rendering in the second mode is apparent when the size of the path is small compared to the size of the bounding box. Since image data may be compressed by the PDL Creation module 707, an image containing mainly one colour, e.g the background colour in the second mode of operation compresses more efficiently than if the image were generated in the third mode of operation, where the non-touched parts can be of any colour.

The Versatile RIP module 909 may also generate an associated "attribute" image containing object-type information (e.g. graphic, image). Such an attribute image may be attached to the image generated in the second or third render modes and sent along with the image containing pixel data to the PDL creation module 707.

Filter Module Basic Process

Figure 1:
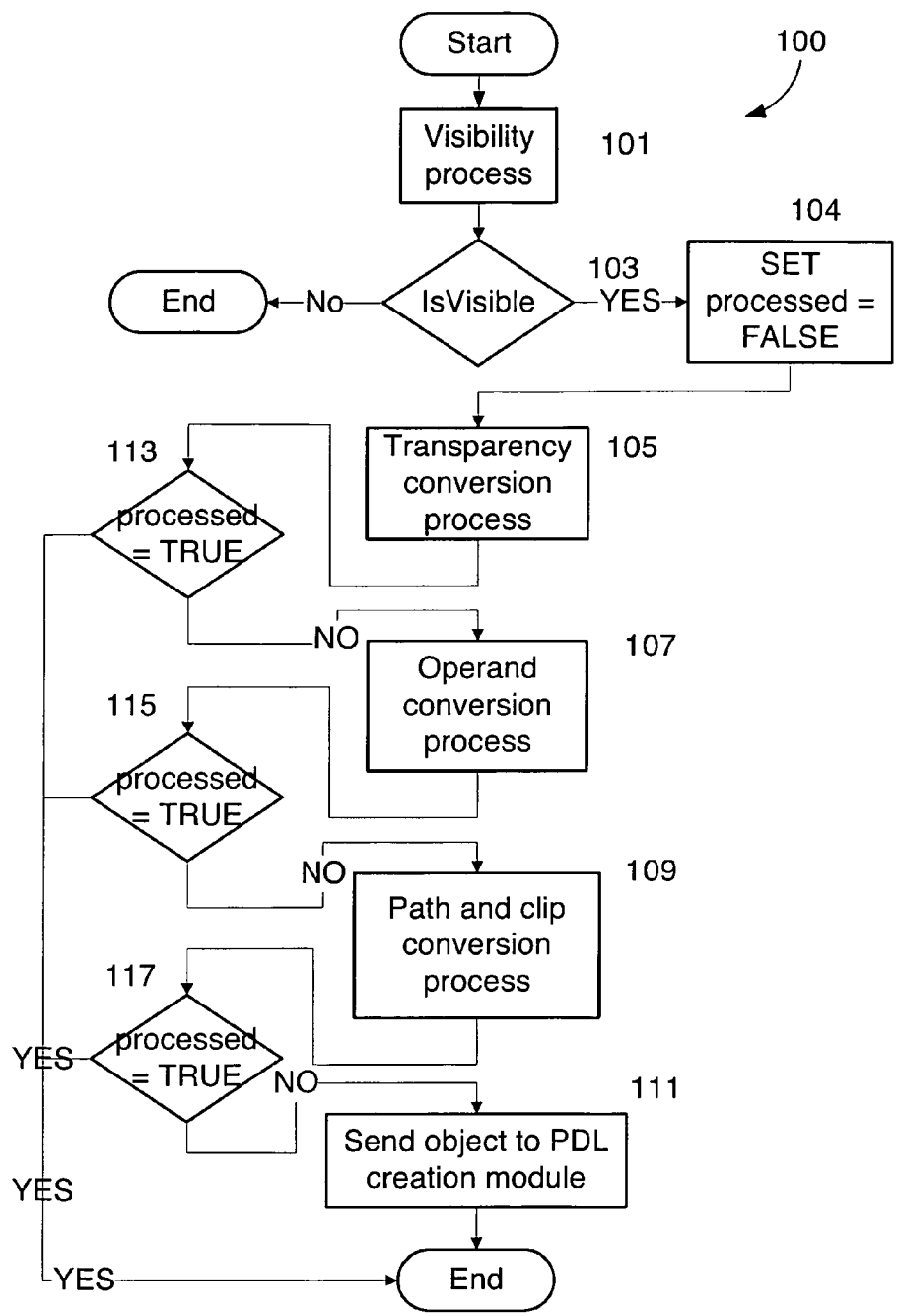
FIG. 1 is a flowchart for the method of processing objects in the filter module of FIG. 7, according to an embodiment.

The flowchart of FIG. 1 illustrates the method 100 of processing objects in the Object Processor 903 module according to the embodiment. In step 101, the object is examined for visibility on the page. This step is described below with reference to the flowchart of FIG. 2. The result of step 1 is examined in step 103. If the object does not appear on the page, then the process is terminated. Otherwise execution proceeds to step 104 where the processed flag is set to FALSE. At next step 105, the transparency conversion process is executed. This is described in the flowchart of FIG. 8. Execution proceeds to step 113. If the processed flag is set to TRUE the process terminates. Otherwise execution proceeds to step 107. At step 107, the operand component of the object is processed. This is described below with reference to the flowchart of FIG. 3. Execution proceeds to step 115. If the processed flag is set to TRUE the process 100 terminates. Otherwise execution proceeds to step 109. At step 109, the path and clip components are processed. This is described below with reference to the flowchart of FIG. 5. Execution proceeds to step 117. If the processed flag is set to TRUE the process 100 terminates. Otherwise execution proceeds to step 111 where the potentially converted path, clip and operand components of the object are sent to the PDL creation module 707. The process 100 then terminates.

Filter Module: Visibility Process

Figure 2:
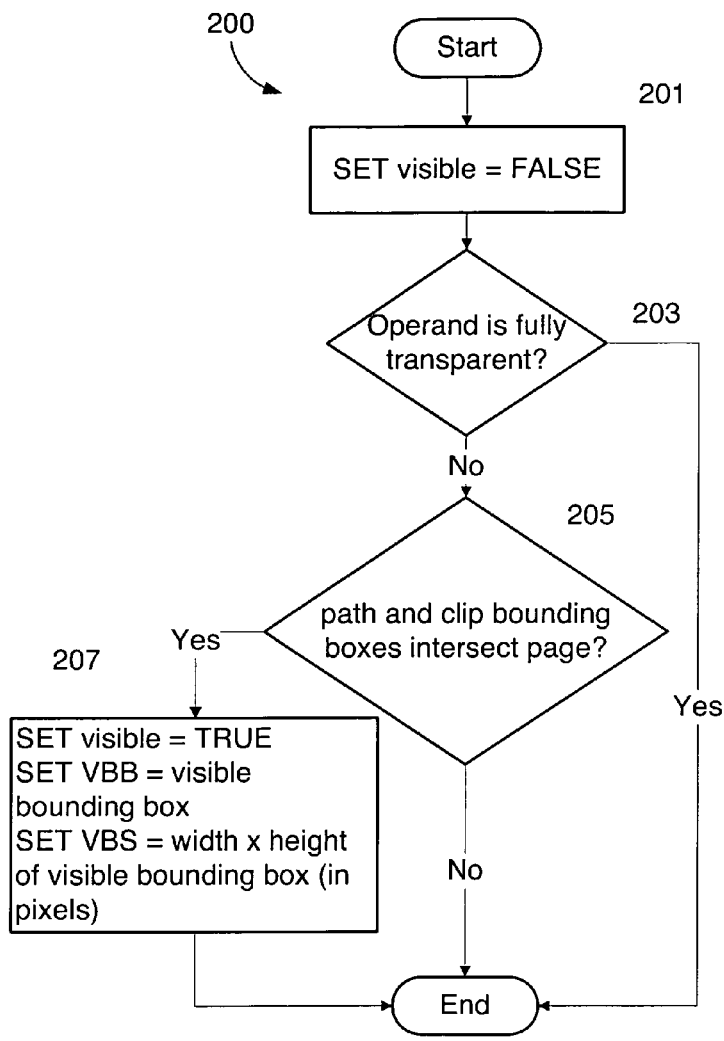
FIG. 2 is a flowchart for the method of determining the visibility of an object, as used in the method of FIG. 1.

The flowchart of FIG. 2 illustrates the process 200 for determining object visibility as used in step 101 of FIG. 1. At step 201 the Boolean visible flag is set to FALSE. At step 203 the operand's transparency is examined. If the operand is fully transparent, then the process 200 is terminated. Otherwise execution proceeds to step 205. At step 205 if the bounding boxes of the path and clip overlap, and the bounding box of their intersection overlaps the page bounds, then execution proceeds to step 207. At step 207, the visible flag is set to TRUE; the visible bounding box is stored in the data structure VBB (being the intersection of the path bounding box, the clip bounding box and the page bounding box in device pixels); and the size of the visible bounding box in pixels is calculated and stored in the variable "VBS" (VisibleBoundingboxSize). Note a data structure for storing a bounding box in device pixels may consist of 4 integral members: Left, Top, Width, Height. Or similarly, it may contain 4 integral members: Left, Top, Right, Bottom.

Filter Module: Group Removal Process

Figure 8A:
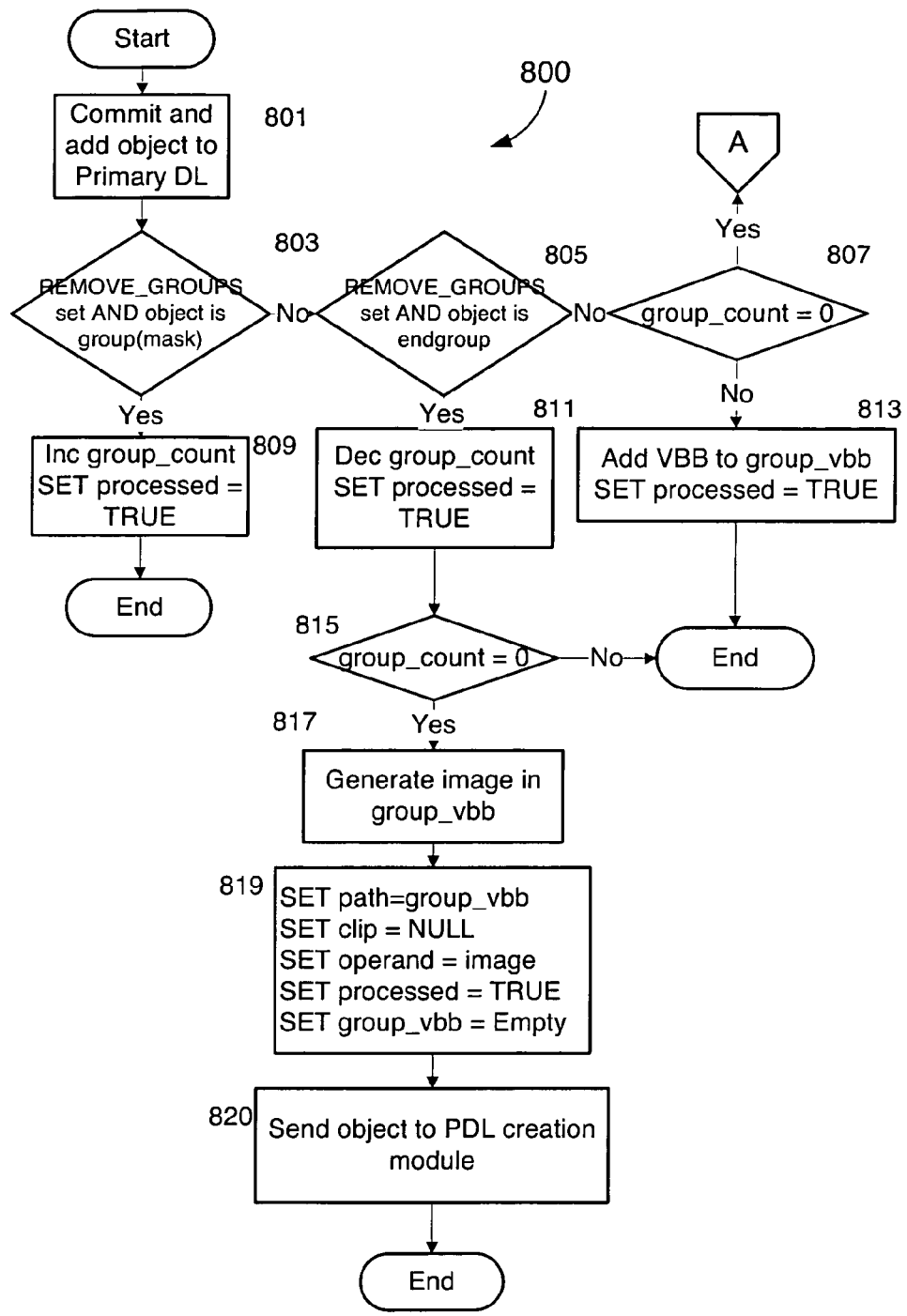
FIG. 8a is a flowchart for processing transparency of groups of objects, as used in the method of FIG. 1.
Figure 8B:
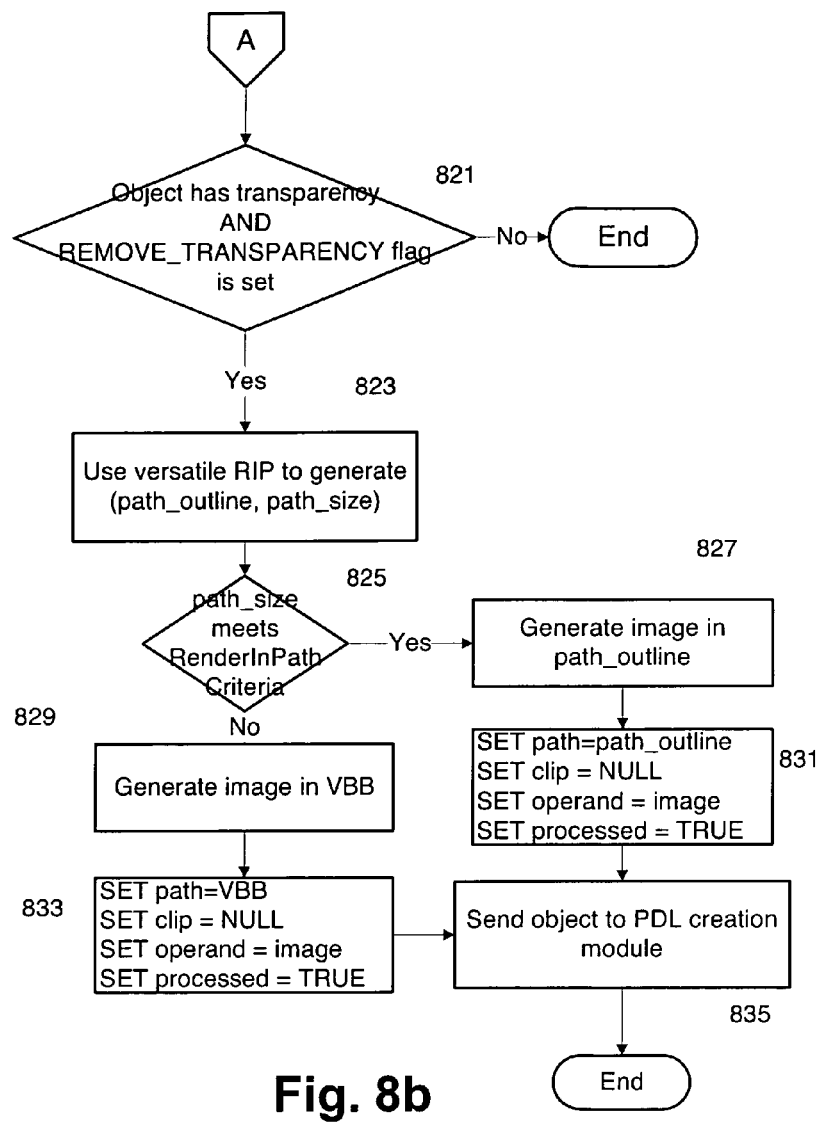
FIG. 8b is a flowchart for processing transparency of single objects, as used in the method of FIG. 1.

The flowcharts of FIG. 8a and FIG. 8b describe the process 800 for handling transparency in general and for removing group instructions in particular as used in step 105 of method 100. (FIG. 8a is continued in FIG. 8b from step 807.) Two variables are assumed to have been initialized when the Filter module 705 was started:

1. a flag variable group_count is initialized to zero.
2. a variable group_vbb is initialized to the Empty rectangle.

At step 801 the Primary DL is committed, causing edges in the CurrentObject edge list to be merged into the Background edge list, and the object is added to the CurrentObject edge list of the Primary DL. At step 803, if the REMOVE_GROUP flag is set and the object is a group (mask) drawing instruction, then execution proceeds to step 809 where the group_count variable is incremented and the processed flag is set to TRUE and the process terminates. Otherwise execution proceeds to step 805. At step 805, if the REMOVE_GROUP flag is set and the object is an endgroup ( ) drawing instruction, then execution proceeds to step 811; otherwise execution proceeds to step 807. At step 807 if the group_count variable is zero, then execution proceeds to step 821; otherwise execution proceeds to step 813. At step 813 the variable group_vbb is set to the union of the VBB of the object and group_vbb. The processed flag is set to TRUE and the process 800 terminates.

At step 811 the group_count flag is decremented and the processed flag is set to TRUE. At step 815 if the group_count flag is zero, then execution proceeds to step 817 otherwise the process 800 terminates. At step 817, the Versatile RIP uses the third render mode to generate an image within the accumulated bounding box of the group of objects, group_vbb. At step 819, the object components are modified such that the object's path is set to the rectangle which describes group_vbb (the visible bounding box of the group), the clip is set to NULL, the operand is set to the image generated in step 817, and group_vbb is reset to the Empty rectangle. Execution proceeds to step 820 where (as in step 111 of method 100) the object is sent to the PDL creation module 707 and the process 800 terminates.

Filter Module: Transparency Removal Process

The flowchart of FIG. 8b illustrates the process for removing transparency after executing step 807 of FIG. 8. At step 821 if the REMOVE_TRANSPARENCY flag is set and the object contains transparency then execution proceeds to step 823. Otherwise the process 800 terminates. At step 823 the Versatile RIP uses the first render mode to generate: i) a simple path outline, being the result of rendering the path and clip components in the CurrentObject edge list, and ii) a path_size integer, being the number of pixels inside the simple path outline.

Execution proceeds to step 825 where if the path_size integer meets the RenderInPath Criteria, then execution proceeds to step 827 otherwise execution proceeds to step 829. The RenderInPath Criteria in the embodiment is defined as the condition whereby $$(\text{path\_size}/\text{VBS}) \times 100 <= \text{RenderInPathThreshold}, \quad (A1).$$

where RenderInPathThreshold is a percentage value in the range 0 to 100.

For example, if the visible bounding box is 50 pixels wide by 50 pixels high, then VBS=50×50=2500. If the RenderInPathThreshold is set to 60, then a path_size of 1500 pixels or less will cause execution to proceed to step 827. Otherwise execution will proceed to step 829.

At step 827 the Versatile RIP uses the second render mode to generate an image which renders pixels only within the bounds of the path. Execution proceeds to step 831 where the object components are modified such that the object's path is set to the simple path_outline generated in step 823, the object's clip is set to NULL (since the clip was effectively removed in step 823), the object's operand is set to the image generated in step 827 and the processed flag is set to TRUE. Execution proceeds to step 835 where (as in step 111 of method 100) the object is sent to the PDL creation module 707 and the process 800 terminates.

Otherwise at step 829, the Versatile RIP uses the third render mode to generate an image within the visible bounding box, VBB. At step 833, the object components are modified such that the object's path is set to the rectangle which defines the visible bounding box, the clip is set to NULL, the operand is set to the image generated in step 829, and the processed flag is set to TRUE. Execution proceeds to step 835 and the process 800 terminates.

Filter Module: Operand Conversion Process

Figure 3:
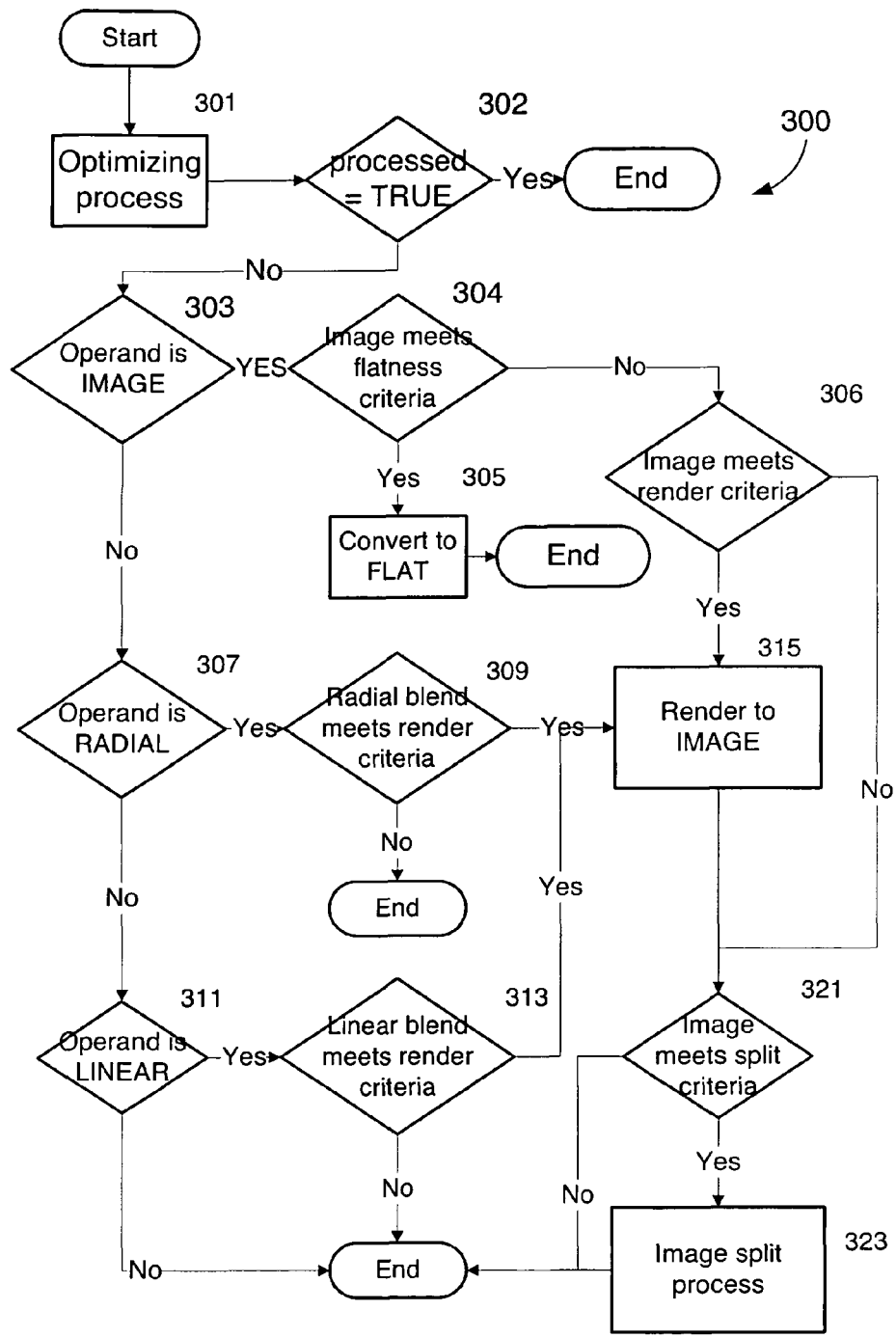
FIG. 3 is a flowchart for the method of processing an operand, as used in the method of FIG. 1.

The flowchart of FIG. 3 illustrates the process 300 for converting an operand as used in step 107 of FIG. 1. At step 301 the path optimizing process which is described below with reference to the flowchart of FIG. 14 is executed. This process may set the processed flag. At next step 302 if the processed flag is TRUE, then the process 300 terminates. Otherwise execution proceeds to step 303. At step 303 if the operand is an image, then execution proceeds to step 304 otherwise execution proceeds to step 307. At step 304, the image is checked for flatness according to the criteria described in the pseudocode of FIG. 4a. If the image is flat then execution proceeds to step 305 where the image operand is replaced with a flat colour operand and the image operand is deleted. From step 305 the process 300 terminates.

At step 304, if the image is not flat, then execution proceeds to step 306. The image is checked for rendering according to the criteria described in the pseudocode of FIG. 4b. If the criteria for rendering are satisfied, then execution proceeds to step 315, otherwise execution proceeds to step 321. At step 315 the operand is replaced with a simple rendered image in device space according to the flowchart of FIG. 16, and execution proceeds to step 321.

Figure 13:
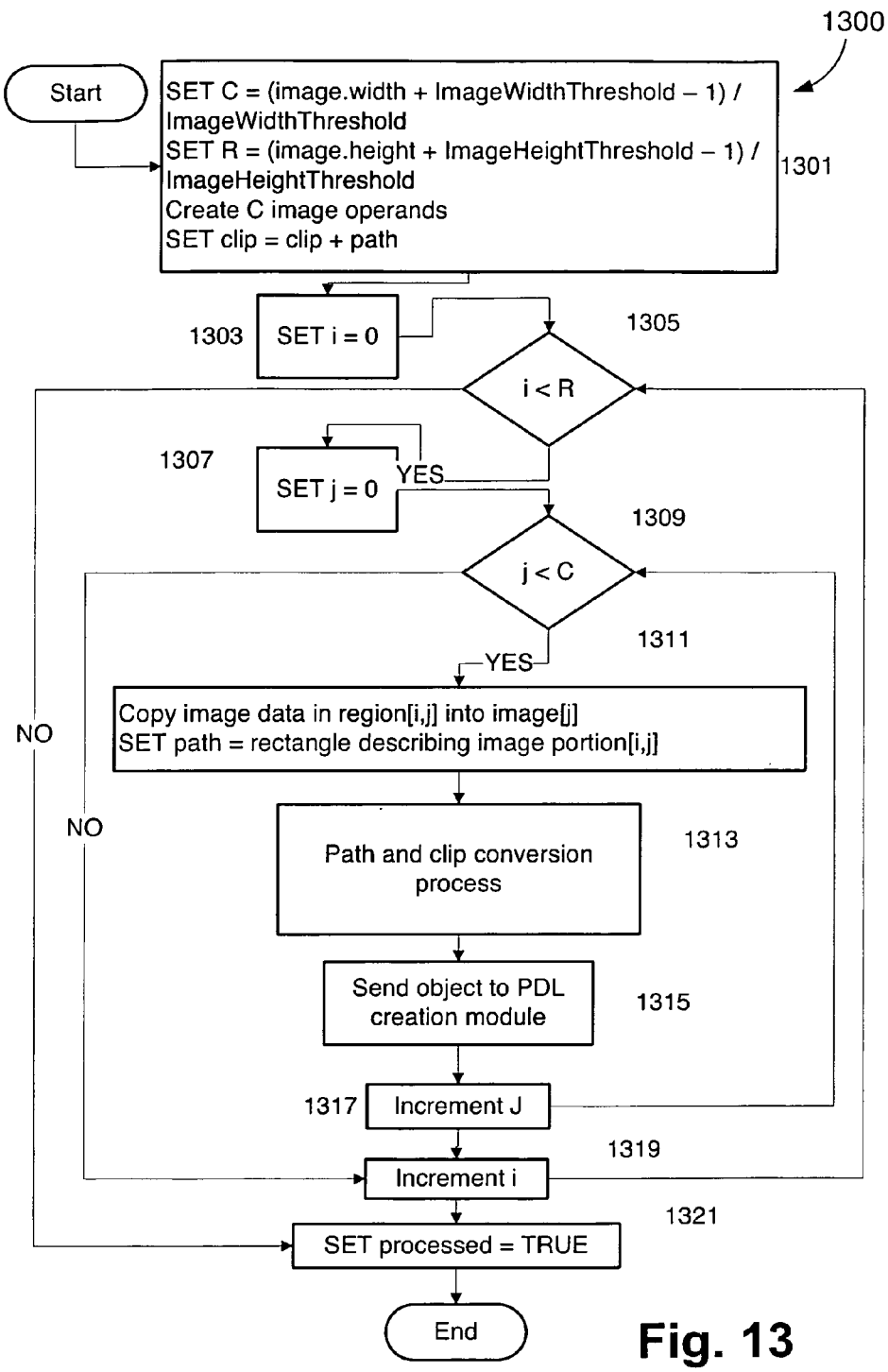
FIG. 13 is a flowchart for a method of dividing large images, as used in the method of FIG. 3.

At step 321, the image is checked for dividing according to the criteria described in the pseudocode of FIG. 4c. If the criteria for dividing the image is satisfied, then execution proceeds to step 323, otherwise the process 300 terminates. At step 323, the image dividing process of FIG. 13 is executed and the process 300 terminates.

At step 307, if the operand is a radial fill, then execution proceeds to step 309, otherwise execution proceeds to step 311. At step 309, the radial fill is checked for rendering according to the criteria described in the pseudocode of FIG. 4d. If the criteria for rendering are satisfied, then execution proceeds to step 315 and the radial fill is replaced with a simple rendered image in device space. Otherwise the process 300 terminates.

At step 311, if the operand is a linear blend, then execution proceeds to step 313, otherwise the process 300 terminates. At step 313, the linear blend is checked for rendering according to the criteria of FIG. 4e. If the criteria for rendering are satisfied, then execution proceeds to step 315 and the linear blend is replaced with a simple rendered image in device space. Otherwise the process terminates.

Filter Module: Operand Simplification Process

Figure 16:
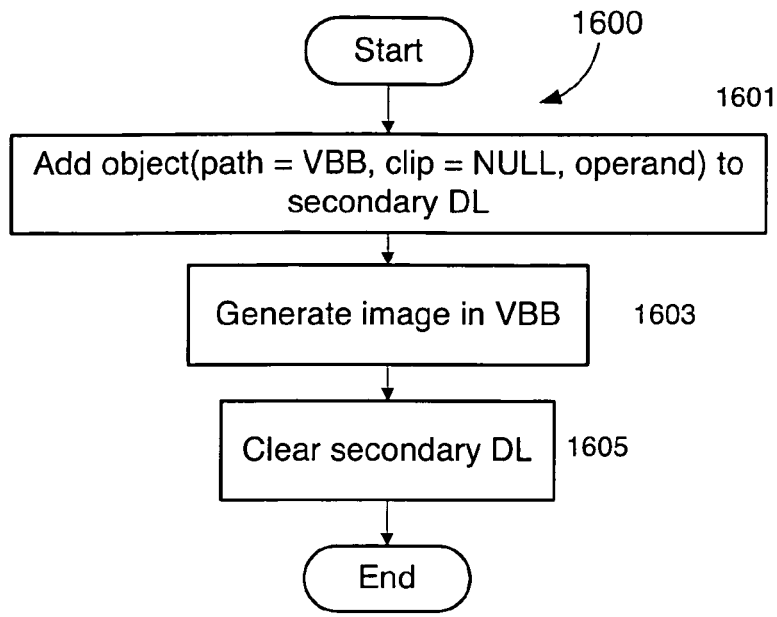
FIG. 16 is a flowchart for a method of processing an operand, as used in the method of FIG. 3.

The flowchart of FIG. 16 illustrates the process 1600 for converting any operand to an image operand which is the size of the visible bounding box of the object, as used in step 315 of FIG. 3. At step 1601, an object whose path component is set to a rectangle describing the visible bounding box VBB, whose clip component is set to NULL, and whose fill component is set to the operand to convert is added to the secondary DL. Execution proceeds to step 1603 where the object is rendered using the third render mode of the Versatile RIP module 909 to an image the size of the visible bounding box, VBB. Execution proceeds to step 1605 where the secondary DL is emptied, and the process 1600 then terminates.

Filter Module: Path/Clip Conversion Process

Figure 5:
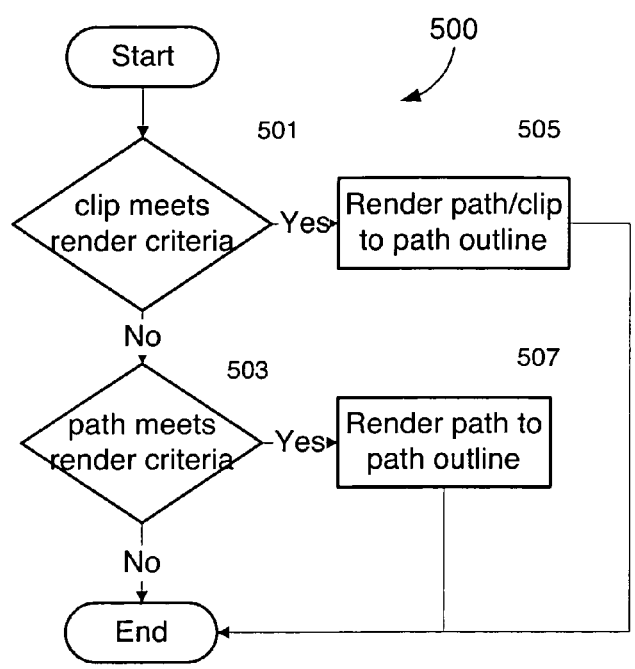
FIG. 5 is a flowchart for the method of processing a path and clip, as used in the method of FIG. 1.

The flowchart of FIG. 5 illustrates the process 500 for converting a path and clip as used in step 109 of FIG. 1. At step 501 the clip is checked for rendering according to the criteria described in the pseudocode of FIG. 6a. If the criteria for rendering the clip are satisfied, then execution proceeds to step 505 where the path and clip are rendered using the first render mode of the Versatile RIP module 909 to a simple non-overlapping path outline in device space. Otherwise if the criteria for rendering the clip are not satisfied, then execution proceeds to step 503. At step 503 the path is checked for rendering according to the criteria described in the pseudocode of FIG. 6b. If the criteria for rendering the path are satisfied, then execution proceeds to step 507 where the path is rendered according to the flowchart of FIG. 17 and the process 500 terminates.

Filter Module: Path Simplification Process

Figure 17:
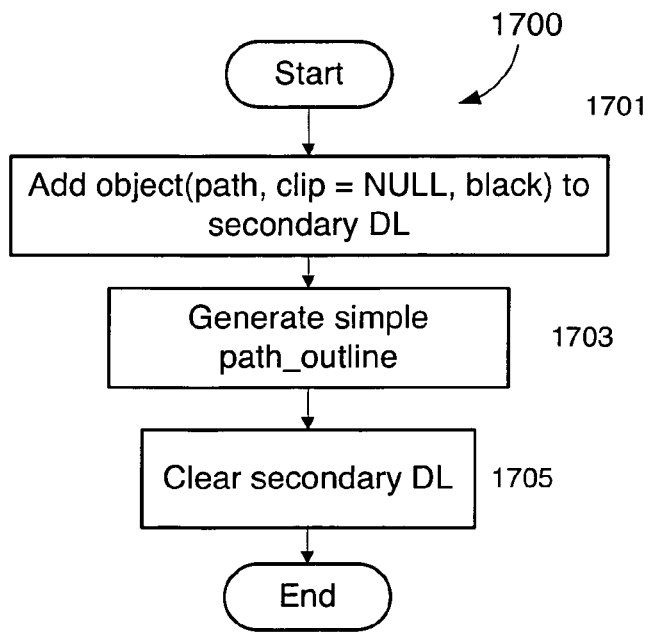
FIG. 17 is a flowchart for a method of processing a path, as used in the method of FIG. 5.

The flowchart of FIG. 17 illustrates the process 1700 for converting a path to a simple non-self-overlapping path outline, as used in step 507 of FIG. 5. At step 1701, an object whose clip component is set to NULL, and whose fill component is set to some arbitrary fill (such as black) is added to the secondary DL. Execution proceeds to step 1703 where the path is rendered using the first render mode of the Versatile RIP module 909 to a simple non-overlapping path outline in device space. Execution proceeds to step 1705 where the secondary DL is emptied, and the process 1700 then terminates.

Filter Module: Image Splitting Process

The flowchart of FIG. 13 illustrates the process 1300 for splitting a large image into smaller image portions where each portion is no greater than the ImageWidthThreshold and ImageHeightThreshold, as used in step 323 of FIG. 3. At step 1301 the number of columns, C, is calculated, the number of rows, R, is calculated. C image operands are created. Each image operand will contain a portion of some row of the large image. Finally, the path is merged with the clip, creating a more complex clip. Execution proceeds to step 1303 where variable i is initialized to 0. At next step 1305, if i is less than R, then execution proceeds to step 1307 where variable j is initialized to 0. Otherwise at step 1305 if i is greater than or equal to R, execution proceeds to step 1321, where variable processed is set to TRUE and the process 1300 terminates. Upon executing step 1307, execution proceeds to step 1309 where if variable j is less than C execution proceeds to step 1311 otherwise execution proceeds to step 1319. At step 1311, the image data in the region corresponding to a column i and a row j is copied into the $j^{th}$ image operand created in step 1301. The path variable is set to a rectangle which describes the image portion [j]. Execution proceeds to step 1313, where the path and clip conversion process is executed as in step 109 of FIG. 1. At step 1315, the resulting object, consisting of a path, clip and operand, is sent to the PDL creation module 707 as in step 111 of FIG. 1. Execution proceeds to step 1317 where variable j is incremented by one.

Filter Module: Optimising Paths

Figure 14:
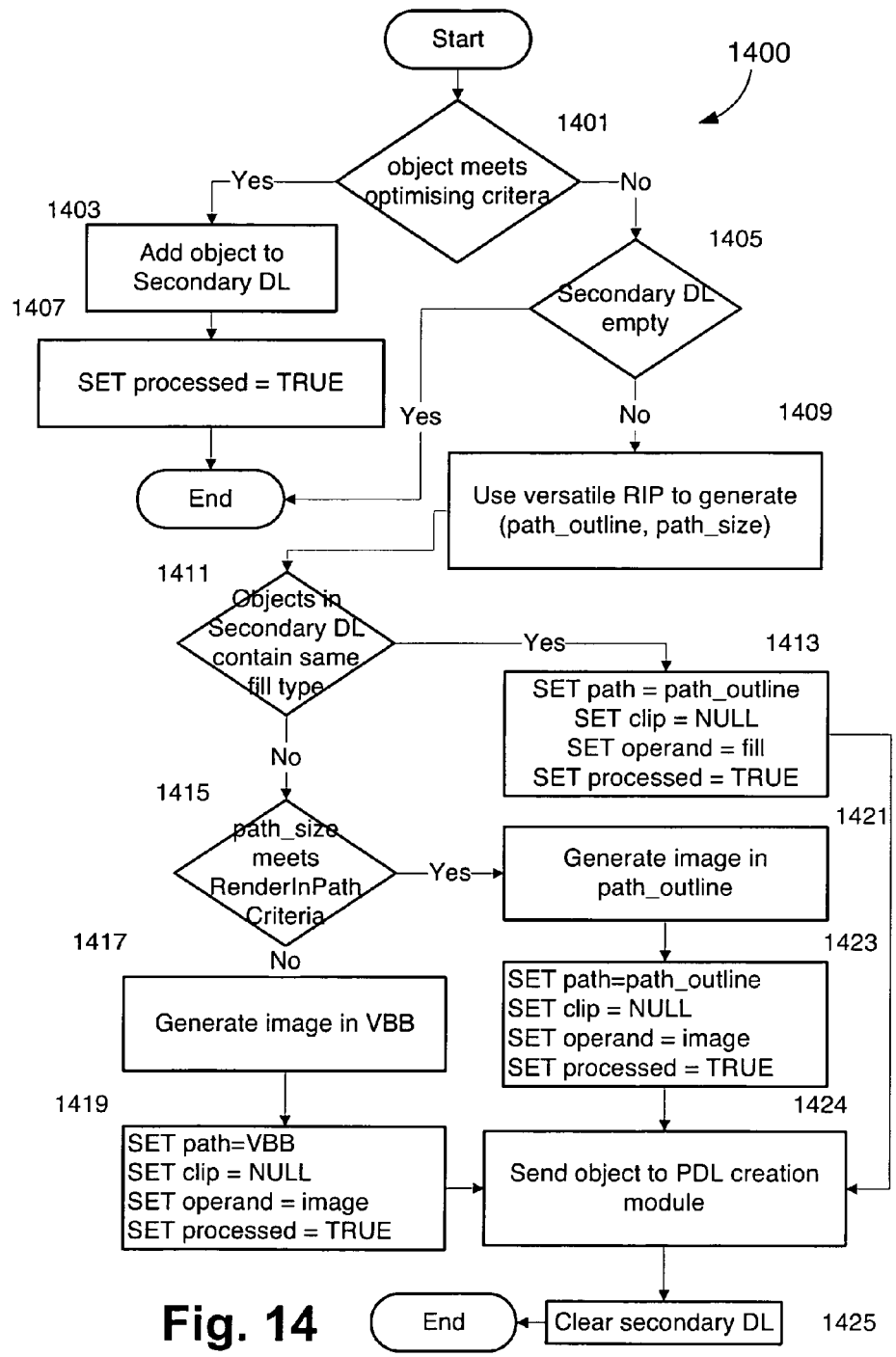
FIG. 14 is a flowchart for a method of optimising path objects, as used in the method of FIG. 3.

The flowchart of FIG. 14 illustrates the process 1400 for optimizing a series of objects, as used in step 301 of FIG. 3. At step 1401, the object is checked for optimizing according to the criteria described in the pseudocode of FIG. 4f. If the criteria for optimizing are satisfied, then execution proceeds to step 1403 and the object is added to the secondary DL. At next step 1407, the processed flag is set to TRUE and the process 1400 terminates. Otherwise at step 1401 if the criteria are not satisfied, then execution proceeds to step 1405. At step 1405, if the secondary DL is empty, then the process 1400 terminates. Otherwise execution proceeds to step 1409. At this point, the secondary DL contains a set of objects, stored in an edge-based display list sorted in ascending Y, then ascending X. The current object has been identified as not being included in the set of objects. Therefore the set of objects in the secondary DL must be converted to a simple object and sent to the PDL Creation module 707.

At step 1409, the Versatile RIP uses the first render mode to generate: i) a simple path outline, being the result of rendering the edges in the secondary DL, and ii) a path_size integer, being the number of pixels inside the simple path outline. Execution proceeds to step 1411, where if the objects in the Secondary DL all contain the same fill, then execution proceeds to step 1413. Otherwise execution proceeds to step 1415. At step 1415, if the path_size integer meets the RenderInPath Criteria, then execution proceeds to step 1421 otherwise execution proceeds to step 1417. The RenderInPath Criteria in the embodiment is defined as the condition (A1) described above.

At step 1421 the Versatile RIP uses the second render mode to generate an image which renders pixels only within the bounds of the path. Execution proceeds to step 1423 where the object components are modified such that the object's path is set to the simple path outline generated in step 1409, the object's clip is set to NULL (since the clip was effectively removed in step 1421), the object's operand is set to the image generated in step 1421 and the processed flag is set to TRUE. Execution proceeds to step 1424 where (as in step 111 of method 100) the object is sent to the PDL Creation module 707 and at step 1425 the secondary DL is emptied and the process 1400 terminates.

Otherwise at step 1417, the Versatile RIP uses the third render mode to generate an image within the visible bounding box, VBB. At step 1419, the object components are modified such that the object's path is set to the rectangle which defines the visible bounding box, the clip is set to NULL, the operand is set to the image generated in step 1417, and the processed flag is set to TRUE. Execution proceeds to step 1424 and at step 1425 the secondary DL is emptied and the process 1400 terminates.

Otherwise if at step 1411 all the objects in the secondary DL use the same fill, then execution proceeds to step 1413. At step 1413, the object components are modified such that the object's path is set to the simple path_outline which was generated in step 1409, the operand is set to the common fill, and the processed flag is set to TRUE. Execution proceeds to step 1424 and at step 1425 the secondary DL is emptied and the process 1400 terminates.

Summary

There are many users owning legacy PDL printers expecting high speed/high quality printing of document formats supporting complex graphics functionality. An intermediate filter module is required to efficiently and optimally convert objects into a format suitable for the target PDL. The unique adaptability of the filter module, utilizing 2 edge-based display lists and a versatile RIP allows it to convert the components of an object or convert an object into another object or convert a series of objects based on specified thresholds without using frame stores or image caches of pre-rendered data.

In cases where the Host processor 1805 is fast compared to the device CPU, print speed may be improved if some conversions are performed on the Host PC 1800, even if the PDL supports the functionality. For example, consider the COMBINE_NONRECT_CLIP_PATH conversion item. If it is known that the speed of the printer RIP decreases in the presence of clipping, then the filter module can be configured to convert all objects containing non-rectangular clips into a simple path outline, effectively eliminating all complex clips. Thus the system according to the embodiments of the invention, by using flags to determine which conversions are to be performed, and the corresponding thresholds governing how the flagged conversions are performed, effectively "balances the load" of printing between the filter module 705 and the device 711.

The forgoing only describes a number of embodiments of the present invention and modification may be made thereto without departing from the scope of the invention.

The claims defining the invention are as follows:

1. A computer-implemented method of modifying an input set of instructions including a group of objects to an output set of instructions intended for rendering the group of objects by an output device, said method comprising:
   determining a bounding box of the group of objects including an object containing transparency;
   determining a size of a render path of the object containing transparency;
   determining a ratio of the size of the render path to the bounding box, said render path including clip components in the input set of instructions; and
   in a case where the ratio is less than a threshold, modifying the input set of instructions to form the output set of instructions by generating an image of the group of objects within the render path without rendering pixels outside the render path, and
   in a case where the ratio is greater than the threshold, modifying the input set of instructions to form the output set of instructions by generating an image of the group of objects with the bounding box including pixels outside the render path.

2. A method according to claim 1, wherein the threshold is set by a user interface dialog box.

3. A system for printing a page description, said system comprising:
   a processor;
   a memory storage device coupled to the processor;
   a printer coupled to the processor; and
   a program stored on the memory storage device and executable by the processor to modify an input set of instructions including a group of objects to an output set of instructions intended for rendering the group of objects by the printer, the program comprising:
   code for determining a bounding box of the group of objects including an object containing transparency;
   code for determining a size of a render path of the object containing transparency;
   code for determining a ratio of the size of the render path to the bounding box, said render path including clip components in the input set of instructions; and
   code, operative for, in a case where the ratio is less than a threshold, modifying the input set of instructions to form the output set of instructions by generating an image of the group of objects within the render path without rendering pixels outside the render path, and
   code, operative for, in a case where the ratio is greater than the threshold, modifying the input set of instructions to form the output set of instructions by generating an image of the group of objects with the bounding box including pixels outside the render path.

4. A non-transitory computer readable storage medium having a computer program recorded thereon, the program being executable by computer apparatus to modify an input set of instructions including a group of objects to an output set of instructions intended for rendering the group of objects by an output device, said program comprising:
   code for determining a bounding box of the group of objects including an object containing transparency;
   code for determining a size of a render path of the object containing transparency;
   code for determining a ratio of the size of the render path to the bounding box, said render path including clip components in the input set of instructions; and
   code, operative for, in a case where the ratio is less than a threshold, modifying the input set of instructions to form the output set of instructions by generating an image of the group of objects within the render path without rendering pixels outside the render path, and
   code, operative for, in a case where the ratio is greater than the threshold, modifying the input set of instructions to form the output set of instructions by generating an image of the group of objects with the bounding box including pixels outside the render path.

5. An information processing apparatus, having a processor, for modifying an input set of instructions including a group of objects to an output set of instructions intended for rendering the group of objects by an output device, said apparatus comprising:
   a first determining unit constructed to determine a bounding box of the group of objects including an object containing transparency;
   a second determining unit constructed to determine a size of a render path of the object containing transparency;
   a third determining unit constructed to determine a ratio of the size of the render path to the bounding box, said render path including clip components in the input set of instructions; and
   a modifying unit constructed to, in a case where the ratio is less than a threshold, modify the input set of instructions to form the output set of instructions by generating an image of the group of objects within the render path without rendering pixels outside the render path, and
   in a case where the ratio is greater than the threshold, modify the input set of instructions to form the output set of instructions by generating an image of the group of objects with the bounding box including pixels outside the render path.

6. An apparatus according to claim 5, wherein the threshold is set by a user interface dialog box.

* * * * *